United States Patent Office 3,252,990
Patented May 24, 1966

3,252,990
PYRAZOLONE DERIVATIVES
Milton Green, Newton Center, and Phylis Moore, Lexington, Mass., assignors to Polaroid Corporation, Cambridge, Mass., a corporation of Delaware
No Drawing. Filed Nov. 18, 1964, Ser. No. 412,221
10 Claims. (Cl. 260—310)

This invention relates to novel chemical compounds and more particularly to certain novel chemical compounds useful as azo couplers and as photographic developing agents.

This application is a continuation-in-part of application Serial No. 130,489, filed August 10, 1961 (now abandoned).

One object of this invention is to provide novel chemical compounds and suitable syntheses for their preparation.

Another object of this invention is to provide novel photographic developing agents and novel compositions for the development of silver halide emulsions.

Another object of this invention is to provide novel color couplers for use in preparing novel dyes.

Other objects of the invention will in part be obvious and will in part appear hereinafter.

The invention accordingly comprises the several steps and the relation and order of one or more of such steps with respect to each of the others, and the products and compositions possessing the features, properties and the relation of elements which are exemplified in the following detailed disclosure, and the scope of the application of which will be indicated in the claims.

For a fuller understanding of the nature and objects of the invention, reference should be had to the following detailed description.

The novel chemical compounds of this invention may be represented by the formula:

(A) 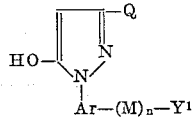

Ar—(M)ₙ—Y¹ wherein Ar is an arylene group, preferably a phenylene or naphthylene group, M is an alkylene group, $n$ is 0 or 1, $Y^1$ is the protected derivative of an ortho- and para-dihydroxyphenyl radical, preferably the O-acyloxy derivative, and more preferably the diacetoxy derivative, and Q is a $$-\overset{O}{\underset{\|}{C}}-O-Z$$

radical wherein Z is an alkyl radical, preferably a lower alkyl radical such as

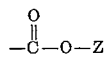

—C₂H₅, —CH—CH₃ and —C(CH₃)₃.

The term acyloxy is intended to signify the grouping

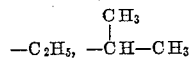

D—C—O— wherein D is an aryl, alkyl, aryloxy, or alkoxy group. The terms alkyl and aryl as employed herein are intended to include the substituted aryl and alkyl groups, for example, aralkyl and alkaryl groups.

As examples of alkylene groups comprehended by the radical M, mention may be made of radicals such as
—CH₂—CH₂—, —CH₂—CH₂—CH₂—,

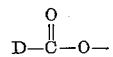

The preferred embodiment of M is a lower alkylene group, i.e., less than six carbon atoms and more preferably an ethylene or propylene group.

In a preferred embodiment, the aryl radical is a phenyl radical, $n$ is 1, and $Y^1$ is a para-diacetoxyphenyl radical, and such compounds may be represented by the formula:

(B) 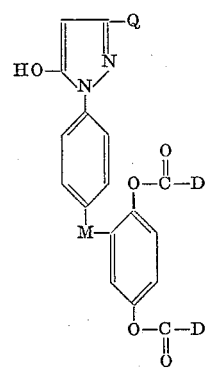

wherein Q, D and M have the same meaning as above.

As compounds within the scope of this invention, mention may be made of:

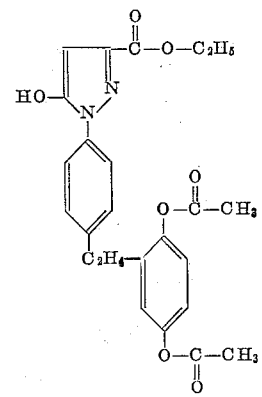

(1) 1-[p-(2′,5′-diacetoxyphenethyl)-phenyl] - 3 - carbethoxy-5-pyrazolone

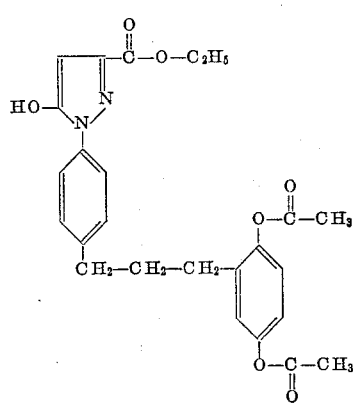

(2) 1-[p-(2′,5′-diacetoxyphenylpropyl)-phenyl] - 3 - carbethoxy-5-pyrazolone

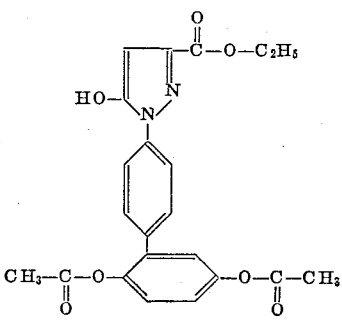

(3) 1-[p-(2',5'-diacetoxyphenyl)-phenyl] - 3 - carbethoxy-5-pyrazolone

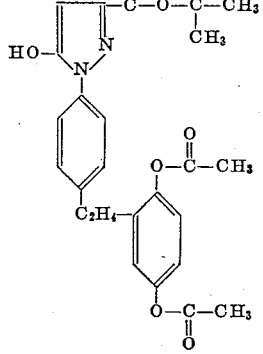

(4) 1-[p-(2',5'-diacetoxyphenethyl)-phenyl] - 3 - carboxy-t-butoxy-5-pyrazolone

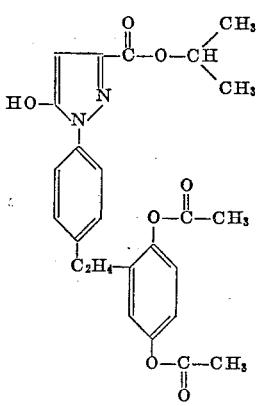

(5) 1-[p-(2',5'-diacetoxyphenethyl)-phenyl] - 3 - carbonylisopropoxy-5-pyrazolone

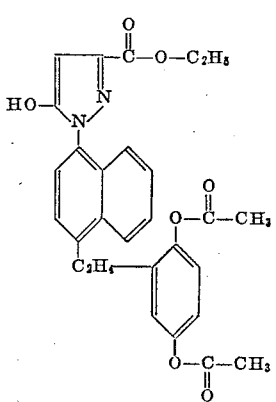

(6) 1-[p-(2',5'-diacetoxyphenethyl)-naphthyl] - 3 - carbethoxy-5-pyrazolone

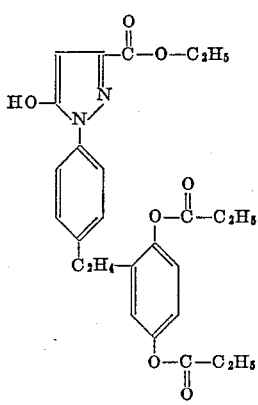

(7) 1-[p-(2',5'-dipropionyloxyphenethyl) - phenyl] - 3 - carbethoxy-5-pyrazolone

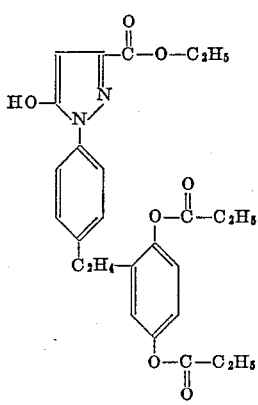

(8) 1-[p-(2',5'-dibenzoyloxyphenethyl)-phenyl] - 3 - carbethoxy-5-pyrazolone

Such compounds within the scope of this invention may be prepared by diazotizing and reacting a compound of the formula:

(C) $\quad Y^1—(M)_n—Ar—NH_2$ wherein $Y^1$, M, n and Ar have the same meaning as above, with a substituted ester of succinic acid.

Suitable substituted esters of succinic acid may be prepared according to the method set out in Org. Synthesis Coll., Vol. II, p. 262.

Compounds within Formula C, when $n=1$, that may be used in this invention are disclosed and claimed in U.S. Patent No. 3,019,254, issued January 30, 1960 to Milton Green and Helen P. Husek, and in U.S. application of Myron S. Simon, Serial No. 196,523, filed May 21, 1961, now U.S. Patent No. 3,183,089, as a continuation-in-part of Serial No. 612,053, filed September 25, 1956, (now abandoned).

Examples of additional compounds which may be O-acylated to form compounds within Formula C are disclosed and claimed in the copending U.S. application of Elkan R. Blout, Milton Green, Myron S. Simon, Howard G. Rogers and Robert B. Woodward, Serial No. 98,287, filed March 27, 1961. Compounds within Fomula C, when $n=0$, that may be used in this invention are disclosed and claimed in U.S. Patent No. 3,134,811 issued May 26, 1964, to Myron S. Simon. It has also been found convenient to use the amine salt of compounds within Formula C, which are also disclosed in the above-cited copending application, in the preparation of compounds of this invention.

Compounds within Formula C may also be prepared from the corresponding dialkoxy compounds by the procedures disclosed in copending U.S. application of Warren E. Solodar, Serial No. 370,041, filed May 25, 1964, and in copending U.S. application of Myron S. Simon, Serial No. 370,066, filed May 25, 1964.

As previously noted, the novel chemical compounds of this invention are useful as photographic developers when the protecting groups are hydrolyzed off $Y^1$ to give hydroxyl groups. It will be understood that in compounds within Formula A wherein Q is a

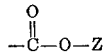

radical and Z is alkyl, if such hydrolysis is desired, suitable precautions should be taken to avoid hydrolysis also of the

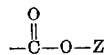

group in the 3-position, unless it is desired to form the corresponding 3-carboxylic acid pyrazolone. The acyloxy protective groups of $Y^1$ are less stable to hydrolysis than the ester group in the 3-position and may be removed, therefore, with relatively mild hydrolysis reaction conditions which will leave said ester group in the 3-position unaffected. Obviously, if the 3-carboxylic acid pyrazolone is desired as the end product, relatively strong hydrolysis reaction conditions are required.

It is also within the scope of this invention to achieve hydrolysis of the compounds of Formula A wherein Q is a

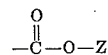

group and Z is a lower alkyl group by reacting such compounds with an excess of an amine; in such a process, not only are the protective groups removed from the hydroquinone moiety, but also, the

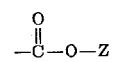

ester group in the 3-position on the pyrazolone is replaced by an amide group at the same time. Such hydrolyzed derivatives have the formula:

(D) 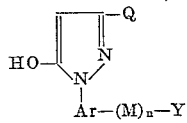

wherein Ar, M, and $n$ have the same meanings as in Formula A, Y is an ortho- or para-dihydroxyphenyl radical and Q' is a

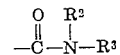

radical wherein each $R^2$ and $R^3$ is hydrogen or an alkyl radical and $R^2$ and $R^3$ together may be a divalent aliphatic radical, e.g., a pentamethylene radical completing, with the nitrogen atom, a piperidine ring. Preferably, $R^2$ and $R^3$ contain no more than 10 to 12 carbons. It should also be understood that the term alkyl, as represented by $R^2$ and $R^3$, is intended to include substituted alkyl radicals, e.g., hydroxyalkyl radicals.

As examples of amines suitable for such use purpose, mention may be made of alcoholic ammonia, primary amines, such as ethylamine, secondary amines, such as diethylamine, heterocyclic amines, amines such as piperidine, hydrazines, hydroxylamines, and quanidine.

As hydrolyzed derivatives of compounds of Formula A within the scope of the invention, mention may be made of:

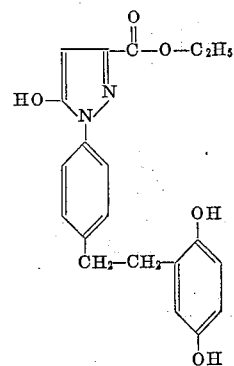

(8) 1-[p-(2',5'-dihydroxyphenethyl)-phenyl] - 3 - carbethoxy-5-pyrazolone

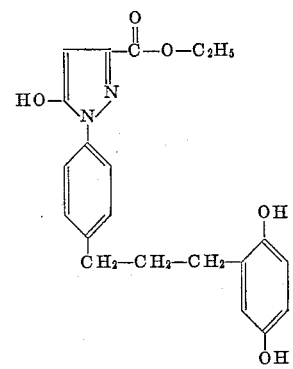

(9) 1-[p-(2',5'-dihydroxyphenylpropyl)-phenyl] - 3 - carbethoxy-5-pyrazolone

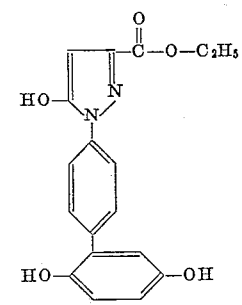

(10) 1-[p-(2',5'-dihydroxyphenyl) - phenyl] - 3 - carbethoxy-5-pyrazolone

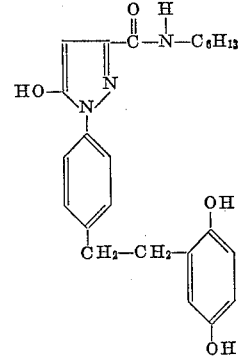

(11) 1-[p-(2',5'-dihydroxyphenethyl)-phenyl] - 3 - n - hexyl-carbamyl-5-pyrazolone

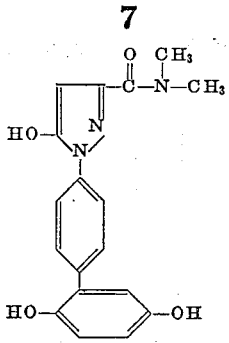

(12) 1-[p-(2′,5′-dihydroxyphenyl)-phenyl] - 3 - N,N-dimethylcarbamyl-5-pyrazolone

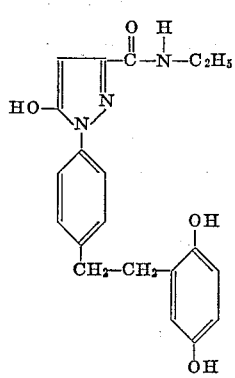

(13) 1-[p-(2′,5′-dihydroxyphenethyl)-phenyl] - 3 - N - ethylcarbamyl-5-pyrazolone

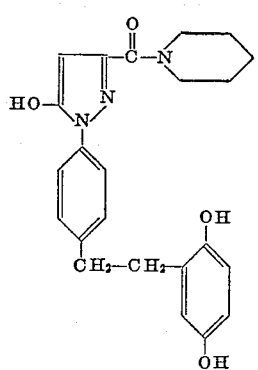

(14) 1-[p-(2′,5′-dihydroxyphenethyl)-phenyl] - 3 - (N-pentamethylene)-carbamyl-5-pyrazolone

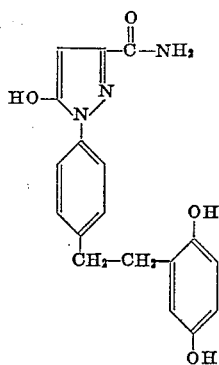

(15) 1-[p-(2′,5′-dihydroxyphenethyl)-phenyl] - 3 - carbamyl-5-pyrazolone

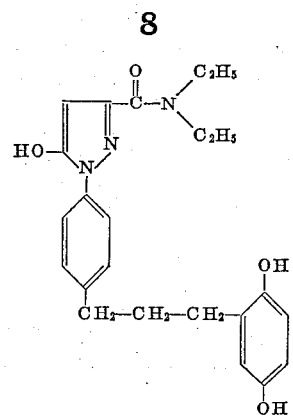

(16) 1-[p-(2′,5′-dihydroxyphenylpropyl) - phenyl] - 3 - N,N-diethylcarbamyl-5-pyrazolone

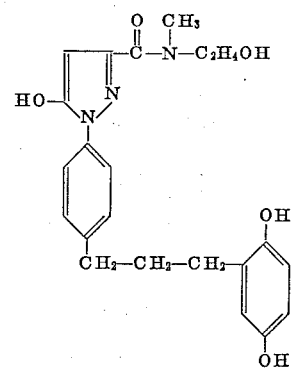

(17) 1-[p-(2′,5′ - dihydroxyphenylpropyl) - phenyl] - 3 - (N-methyl-N′-hydroxyethyl-carbamyl)-5-pyrazolone

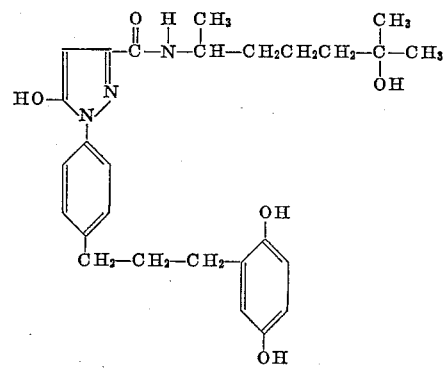

(18) 1-[p-(2′,5′-dihydroxyphenylpropyl) - phenyl] - 3 - [N-(1′,5′-dimethyl-5′-hydroxyhexyl)-carbamyl]-5-pyrazolone

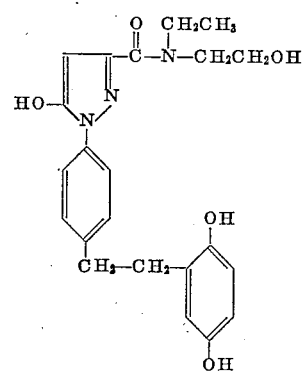

(19) 1-[p-(2′,5′-dihydroxyphenethyl)-phenyl] - 3 - [N-ethyl, N-(hydroxy)-ethyl-carbamyl-5-pyrazolone

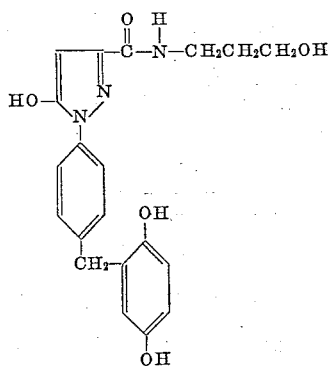

(20) 1-[p-(2',5'-dihydroxyphenylmethyl)-phenyl] - 3 - (N-hydroxypropyl)-carbamyl-5-pyrazolone

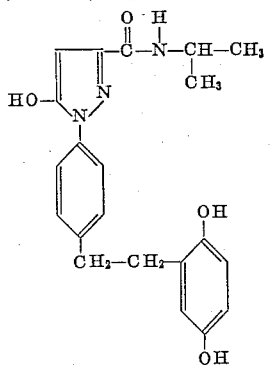

(21) 1-[p-(2',5'-dihydroxyphenethyl)-phenyl] - 3 - N-isopropyl-carbamyl-5-pyrazolone

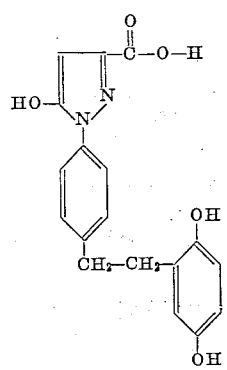

(22) 1-[p-(2',5'-dihydroxyphenethyl)-phenyl] - 3 - carboxy-5-pyrazolone

The following examples illustrate the preparation of compounds within the scope of this invention and are given as illustrations only.

*Example 1*

34.9 grams of 2,5-diacetoxyphenethylaniline hydrochloride were dissolved in 200 ml. of water. 20 ml. of concentrated hydrochloric acid were then added. The solution was then cooled to 0 to 2° C. and diluted with 200 ml. of water. The resulting suspension was stirred well and kept at 0–4° C. while 7 grams of a 10% aqueous solution of sodium nitrite were added over a 5 minute period. Stirring was then continued for an additional 10 minute period at 0–4° C. The excess nitrous acid was then decomposed by the addition of sulfamic acid to the diazonium solution.

21 grams of diethylacetosuccinate were dissolved in 750 ml. of pyridine and the solution was cooled while the diazonium solution was added slowly over a 30 minute period. The solution was then stirred at room temperature for 20 hours. The solution was then cooled and acidified by the slow addition of 800 ml. of concentrated hydrochloric acid. The resulting aqueous layer was decanted and the dark brown oily residue was triturated with approximately 100 ml. of 3 N hydrochloric acid. The aqueous layer was then again decanted. The dark brown oil was dissolved in 2 liters of diethyl ether with heating and stirring. The solution was filtered and the filtrate washed in a separatory funnel with two 200 ml. portions of 3 N hydrochloric acid, and 200 ml. of water. The washed ether solution, after drying over anhydrous sodium sulfate, and concentrated over a steam cone, yielded a yellow solid. The product, 1-[p-(2',5'-diacetoxyphenethyl)-phenyl]-3-carbethoxy-5-pyrazolone,

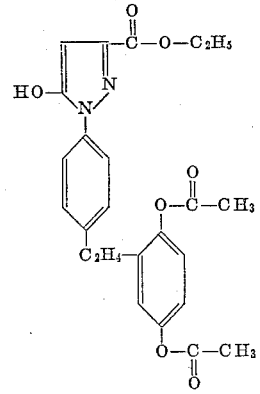

was purified by washing with about 150 ml. of ether. After drying in air the product weighed 23.2 grams and showed a melting point of 179–182° C. Analysis of the product showed:

|  | C | H | N |
|---|---|---|---|
| Calculated | 63.69 | 5.34 | 6.19 |
| Found | 63.12 | 5.27 | 5.99 |

*Example 2*

1 - [p - (2',5' - diacetoxyphenylpropyl)-phenyl]-3-carbethoxy-5-pyrazolone was prepared by reacting diethylacetosuccinate with 2,5-diacetoxyphenylpropylaniline hydrochloride according to the method of Example 1. The melting point of the product was found to be 148–152° C.

*Example 3*

1 - [p-(2',5'-diacetoxyphenyl)-phenyl]-3-carbethoxy-5-pyrazolone was prepared by reacting diethylacetosuccinate with a 2,5-diacetoxyphenylaniline hydrochloride according to the method of Example 1. The melting point of the product was found to be 175–179° C.

In like manner, 1-[p-(2',5'-diacetoxyphenethyl)-phenyl]-3-carboxy-t-butoxy-5-pyrazolone and 1-[p-(2',5'-diacetoxyphenethyl) - phenyl]-3-carbonylisopropoxy-5-pyrazolone were prepared.

*Example 4*

15.35 grams of 1-[p-(2',5'-diacetoxy-phenethyl)-phenyl]-3-carbethoxy-5-pyrazolone prepared as in Example 1 and 75 cc. of n-hexylamine were mixed and refluxed under nitrogen for 15 hours. The mixture was cooled and poured into 1 liter of ice cold 3 N hydrochloric acid. The resulting gummy precipitate solidified on standing for a few hours; it was collected and air dried. The crude product as obtained was Soxhlet extracted with $CHCl_3$, but most did not dissolve. The insoluble portion was recovered and recrystallized from ethyl acetate. It was dried over $P_2O_5$ and under oil pump vacuum at 78° C. Yield 2.6 grams of 1-(4'-hydroquinonylethyl)-phenyl-3-n-hexylcarbamyl-5-pyrazolone, melting at 136–140° C. The product was confirmed by infrared analysis.

*Example 5*

A suspension of 9.04 grams (.020 mole of 1-[p-(2',5'-diacetoxyphenethyl) - phenyl]-3-carbethoxy-5-pyrazolone, prepared as in Example 1, in 100 cc. of ethanol was stirred under nitrogen and cooled to −5° C. A solution of 6.0 grams (.130 mole) of sodium hydroxide in 100 ml. of water, previously de-oxygenated, was added over a five minute period at such a rate that the temperature never exceeded +7° C. The mixture was stirred for one hour between −3° C. and +3° C., and was then acidified with a solution of 12.5 ml. of 12 N HCl in 500 ml. of water. The product which separated as a gum was triturated with warm benzene until it solidified. The solid was dried, ground to a powder, and extracted in a Soxhlet extractor with dichloroethane, and then acetonitrile. The final solid material melted at 110–114° C. Yield 3.5 grams.

The product was confirmed to be 1-[p-(2′,5′-dihydroxyphenethyl)-phenyl]-3-carbethoxy-5-pyrazolone by infrared analysis, nuclear magnetic resonance spectra, and titration with base.

*Example 6*

A solution of 20 grams of sodium hydroxide in 200 ml. of water was de-oxygenated with nitrogen for 20 minutes. 9.04 grams of 1-[p-(2′,5′-diacetoxyphenethyl)-phenyl]-3-carbethoxy-5-pyrazolone, prepared as in Example 1, was added, and the mixture was heated on a steam bath for three hours. It was cooled, and acidified with 150 cc. of 10% HCl. The resulting solid was collected and dried (yield 8.0 grams), and recrystallized from ethanol. The final product softened at 195° C., and began to decompose at 185° C.

The product was confirmed to be 1-[p-(2′,5′-dihydroxyphenethyl)-phenyl]-3-carboxy-5-pyrazolone by infrared analysis, nuclear magnetic resonance spectra, and titration with base.

The novel compounds of this invention are also useful as couplers in the formation of azo dyes, and particularly in preparing dye developers, as disclosed in the copending applications of Milton Green, Serial Nos. 301,197 and 301,198, both filed August 9, 1963, as continuations-in-part of Serial No. 130,498, filed August 10, 1961 (now abandoned) and Serial No. 130,468, filed August 10, 1961 (now abandoned); the photographic use of said dye developers is disclosed and claimed in U.S. Patent No. 3,141,772 issued July 21, 1964, to Milton Green.

Since certain changes may be made in the above processes and products without departing from the scope of the invention herein involved, it is intended that all matter contained in the above description shall be interpreted as illustrative and not in a limiting sense.

What is claimed is:

1. A compound of the formula:

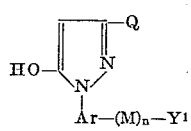

wherein Ar is selected from the group consisting of phenylene and naphthylene, M is a lower alkylene group, $n$ is an integer from 0 to 1, inclusive, $Y^1$ is selected from the group consisting of ortho- and para-dibenzoyloxyphenyl and ortho- and para-di-lower alkyl carbonyloxyphenyl, and Q is a

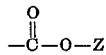

radical wherein Z is lower alkyl.

2. 1-[p-(2′,5′-diacetoxyphenethyl)-phenyl]-3 - carbethoxy-5-pyrazolone.
3. 1-[p-(2′,5′-diacetoxyphenylpropyl)-phenyl] - 3 - carbethoxy-5-pyrazolone.
4. 1-[p-2′,5′-diacetoxyphenyly)-phenyl-] - 3 - carbethoxy-5-pyrazolone.
5. A compound of the formula:

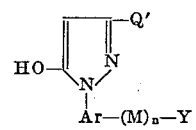

wherein Ar is selected from the group consisting of phenylene and naphthylene, M is a lower alkylene group, $n$ is an integer from 0 to 1, inclusive, Y is selected from the group consisting of ortho- and para-dihydroxyphenyl, and Q′ is selected from the group consisting of

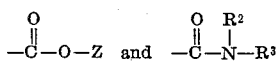

radicals wherein Z is selected from the group consisting of hydrogen and lower alkyl and $R^2$ and $R^3$ each are selected from the group consisting of hydrogen and alkyl of no more than 12 carbon atoms and $R^2$ and $R^3$ taken together may be pentamethylene.

6. 1-[p-(2′,5′-dihydroxyphenethyl)-phenyl]-3 - carbethoxy-5-pyrazolone.
7. 1-[p - (2′,5′ - dihydroxyphenylpropyl)-phenyl] - 3-carbethoxy-5-pyrabolone.
8. 1-[p-(2′,5′-dihydroxyphenyl)-phenyl]-3- carbethoxy-5-pyrazolone.
9. 1-[p-(2′,5′-dihydroxyphenethyl)-phenyl]-3 - n-hexylcarbamyl-5-pyrazolone.
10. 1-[p-(2′,5′-dihydroxyphenethyl)- phenyl] - 3 - carboxy-5-pyrazolone.

References Cited by the Examiner

FOREIGN PATENTS 853,479   11/1960   Great Britain.
220,748   7/1942    Switzerland.

IRVING MARCUS, *Primary Examiner.*

WALTER A. MODANCE, *Examiner.*